(12) United States Patent
Gayden et al.

(10) Patent No.: US 7,252,218 B2
(45) Date of Patent: *Aug. 7, 2007

(54) BIPOLAR PLATE FABRICATION BY ROLL BONDING

(75) Inventors: Xiaohong Gayden, West Bloomfield, MI (US); Yen-Lung Chen, Troy, MI (US); David R Sigler, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 138 days.

This patent is subject to a terminal disclaimer.

(21) Appl. No.: 10/738,402

(22) Filed: Dec. 17, 2003

(65) Prior Publication Data

US 2005/0133575 A1 Jun. 23, 2005

(51) Int. Cl.
*B23K 31/02* (2006.01)
(52) U.S. Cl. ............... 228/235.2; 228/215; 228/183; 29/890.042

(58) Field of Classification Search ............ 228/235.2, 228/157, 215, 115, 183, 3.1, 901; 29/890.041, 29/890.042
See application file for complete search history.

(56) References Cited

U.S. PATENT DOCUMENTS

| | | | | |
|---|---|---|---|---|
| 2,906,006 A | * | 9/1959 | Neel | 29/890.041 |
| 3,271,846 A | * | 9/1966 | Buechele et al. | 29/890.042 |
| 3,334,398 A | * | 8/1967 | Middleton | 29/890.042 |
| 3,340,589 A | * | 9/1967 | Jaeger | 228/118 |
| 3,394,446 A | * | 7/1968 | Valyi | 228/118 |
| 3,421,577 A | * | 1/1969 | Valyi | 165/170 |
| 3,981,753 A | * | 9/1976 | Hopper | 148/23 |
| 4,080,702 A | * | 3/1978 | Chatfield et al. | 29/890.042 |
| 6,052,887 A | | 4/2000 | Dziadosz et al. | |
| 6,350,539 B1 | | 2/2002 | Wood, III et al. | |
| 6,358,642 B1 | | 3/2002 | Griffith et al. | |
| 6,503,653 B2 | | 1/2003 | Rock | |

* cited by examiner

*Primary Examiner*—Jonathan Johnson

(57) ABSTRACT

An anti-bonding material is placed in a desired pattern onto a first sheet of conductive material. A second sheet of conductive material is roll bonded with the first sheet of material. Fluid is injected between the bonded first and second sheets of material to expand the sheets of material at the desired pattern. A flow channel is formed at the desired pattern between the first and second sheet during fluid injection.

17 Claims, 5 Drawing Sheets

BIPOLAR PLATE FABRICATION BY ROLL BONDING

FIELD OF THE INVENTION

The present invention relates to bipolar plates, and more particularly to a method of making a bipolar plate using roll bonding.

BACKGROUND OF THE INVENTION

Current collector plates or bipolar plates are an integral part of the fuel cell stack. Current collector plates function in a fuel cell stack as fluid distribution elements and function as bipolar plates to separate MEAs from one another. Each plate assembly is typically constructed of thin gauge metal sheets such as stainless steel coated with a conductive coating. Generally, two adjacent metal sheets are joined together forming a conductive heat exchanger. The joined plate assembly has internal flow channels along its length for coolant flow. Channels on either side of the bipolar plate serve as distribution pathways for fuel and oxidant gas to adjacent current collectors. A hermetic seal is required around the perimeter of the joined plates to prevent mixing of the coolant, fuel, oxidant gas and reactant products. High conductivity must be maintained between the two metal sheets that form the bipolar plate to achieve efficient fuel cell operation.

A conventional method of constructing a bipolar plate has been to first stamp the flow channels into the sheet material and subsequently join the sheets together. Stamping however is unfavorable because it subjects the sheets to high strains and distortion. In addition, joining stamped structures may be complicated. First, after stamping, there is minimal sheet to sheet contact between flow channels, thus, alignment and weld containment are difficult. Secondly, access for joining between the flow channels is obstructed by the flow channel structure.

A variety of joining techniques have been considered to overcome the drawbacks associated with conventional stamping followed by joining. These include brazing, adhesive bonding and fusion welding. These too, however, present unfavorable drawbacks. Brazing of austenitic stainless steel has been successful, but is costly. The cost is partially attributed to the acid cleaning and batch coating necessary after the brazing operation. Both adhesive bonding and fusion welding allow the stainless sheet to be acid cleaned and coated with a continuous coil operation prior to joining which is less costly. Adhesive bonding, however, suffers from durability issues regarding strength and conductivity. Fusion welding of austenitic stainless steel produces a number of potential concerns including distortion, weld cracking, sensitization, stress corrosion cracking, degraded corrosion resistance, damage to the organic coating, sheet alignment, access between flow channels and small contact areas between flow channels for weld containment.

SUMMARY OF THE INVENTION

A method for making a current collector plate includes providing a first sheet of material having a first bonding face and a first outer face. A second sheet of material is provided having a second bonding face and a second outer face. A plurality of patterned areas are created on at least one of the first bonding face and the second bonding face. The first and second sheets are bonded together. Pressurized fluid is injected between the first and second sheet thereby causing at least one of the first and second sheets to project outwardly at the plurality of patterned unbonded areas.

In other features, forming a plurality of patterned areas includes placing an anti-bonding material on at least one of the first bonding face and the second bonding face and defining bonding areas at the remaining areas of the first bonding face and the second bonding face. Bonding the first and second sheets together includes contacting the first bonding face with the second bonding face. A force is imposed onto at least one of the first and second outer faces thereby joining the first and second sheets at the bonding area.

According to other features, injecting fluid includes placing the first and second bonded sheets into a die having spaced apart first and second boundaries. Fluid is injected between the first and second sheet whereby the extension portions contact one of the first and second boundaries so as to form a flat surface thereat. A flow channel is formed between the first and second sheet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
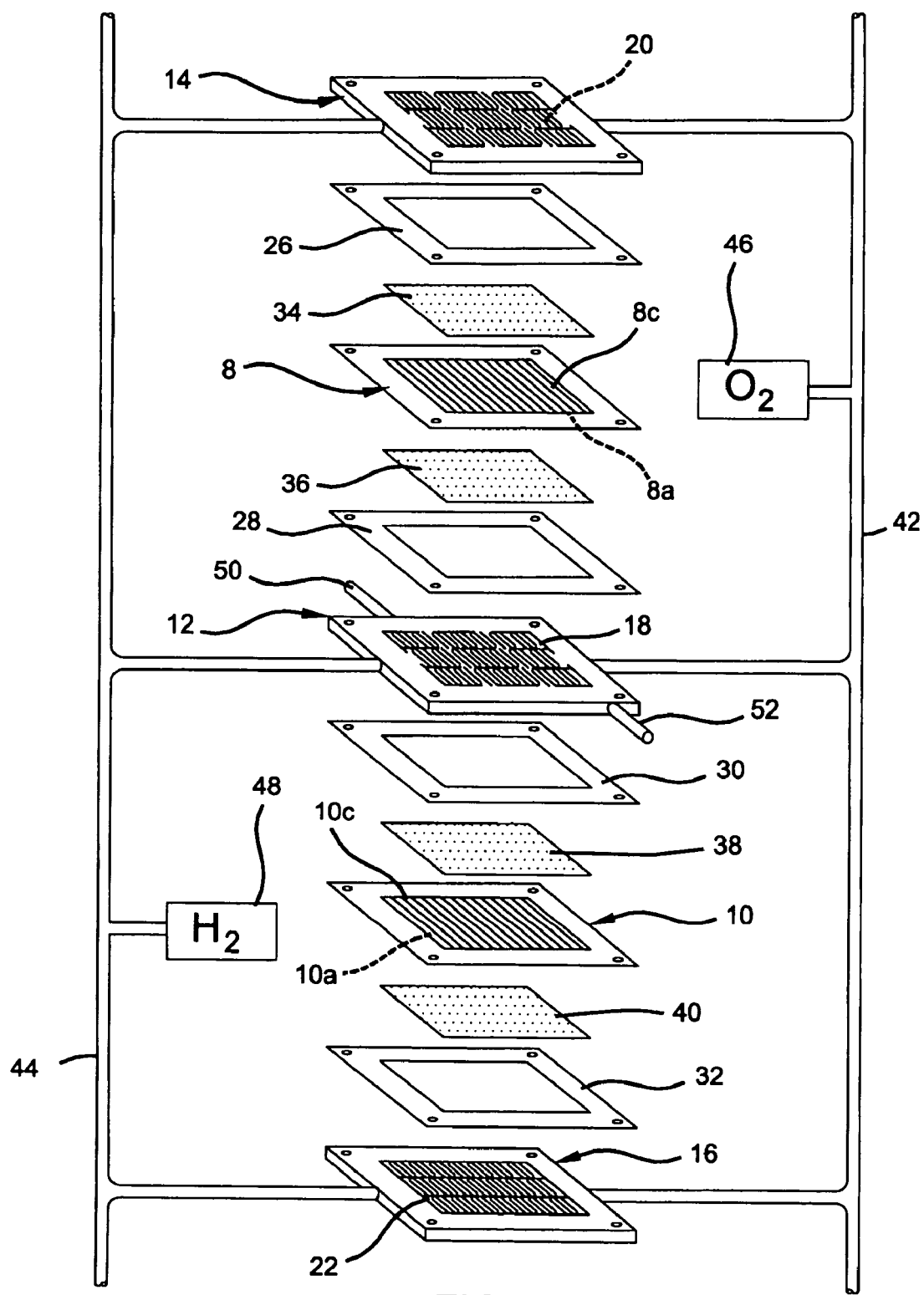
FIG. 1 is a schematic isometric exploded illustration of a PEM fuel stack.

The following description of the preferred embodiment is merely exemplary in nature and is in no way intended to limit the invention, its application, or uses. For purposes of clarity, the same reference numbers will be used in the drawings to identify similar elements.

FIG. 1 schematically depicts a partial PEM fuel cell stack having a pair of membrane-electrode-assemblies (MEAs) 8 and 10 separated from each other by a non-porous, electrically-conductive bipolar plate 12. Each of the MEAs 8, 10 have a cathode face 8c, 10c and an anode face 8a, 10a. The MEAs 8 and 10, and bipolar plate 12, are stacked together between non-porous, electrically-conductive, liquid-cooled bipolar plates 14 and 16. The bipolar plates 12, 14 and 16 each include flow fields 18, 20 and 22 having a plurality of flow channels formed in the faces of the plates for distributing fuel and oxidant gases (e.g., $H_2$ and $O_2$) to the reactive faces of the MEAs 8 and 10. Nonconductive gaskets or seals 26, 28, 30 and 32 provide a seal and electrical insulation between the several plates of the fuel cell stack.

Porous, gas permeable, electrically conductive sheets 34, 36, 38 and 40 press up against the electrode faces of the MEAs 8 and 10 and serve as primary current collectors for the electrodes. Primary current collectors 34, 36, 38 and 40 also provide mechanical supports for the MEAs 8 and 10, especially at locations where the MEAs are otherwise unsupported in the flow field. Suitable primary current collectors include carbon/graphite paper/cloth, fine mesh noble metal screens, open cell noble metal foams, and the like which conduct current from the electrodes while allowing gas to pass therethrough.

Bipolar plates 14 and 16 press up against the primary current collector 34 on the cathode face 8c of MEA 8 and primary current collector 40 on the anode face 10a of MEA 10, while the bipolar plate 12 presses up against the primary current collector 36 on the anode face 8a of MEA 8 and against the primary current collector 38 on the cathode face 10c of MEA 10. An oxidant gas such as oxygen or air is supplied to the cathode side of the fuel cell stack from a storage tank 46 via appropriate supply plumbing 42. Similarly, a fuel such as hydrogen is supplied to the anode side of the fuel cell from a storage tank 48 via appropriate supply plumbing 44. In a preferred embodiment, the oxygen tank 46 may be eliminated, and air delivered to the cathode side from the ambient. Likewise, the hydrogen tank 48 may be eliminated and hydrogen supplied to the anode side from a reformer which catalytically generates hydrogen from methanol or a liquid hydrocarbon (e.g., gasoline). Exhaust plumbing (not shown) for both the $H_2$ and $O_2$/air sides of the MEAs is also provided for removing $H_2$ depleted anode gas from the anode flow field and $O_2$ depleted cathode gas from the cathode flow field. Coolant plumbing 50 and 52 is provided for supplying and exhausting liquid coolant to the bipolar plate 12, as needed. It is appreciated that coolant may additionally or alternatively be provided to the bipolar plates 14 and 16.

Figure 2:
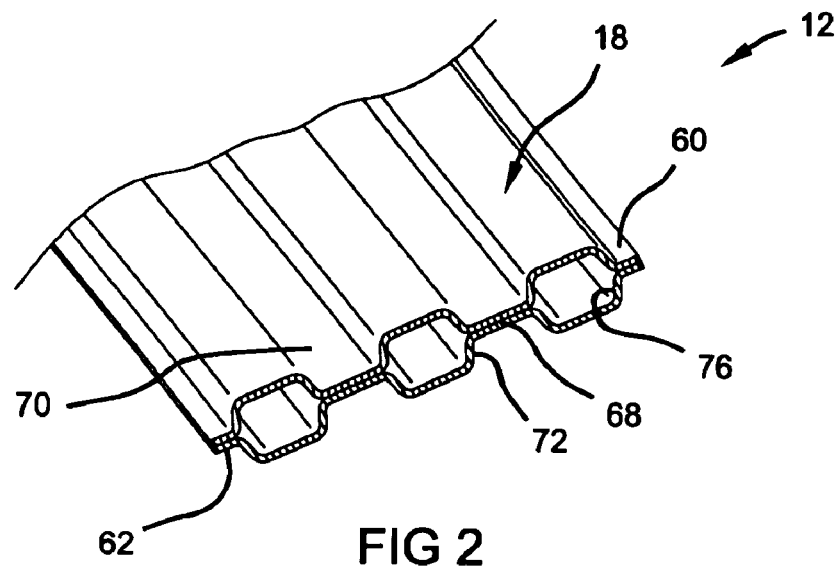
FIG. 2 is a sectional view of a cooled bipolar plate of FIG. 1.
Figure 3:
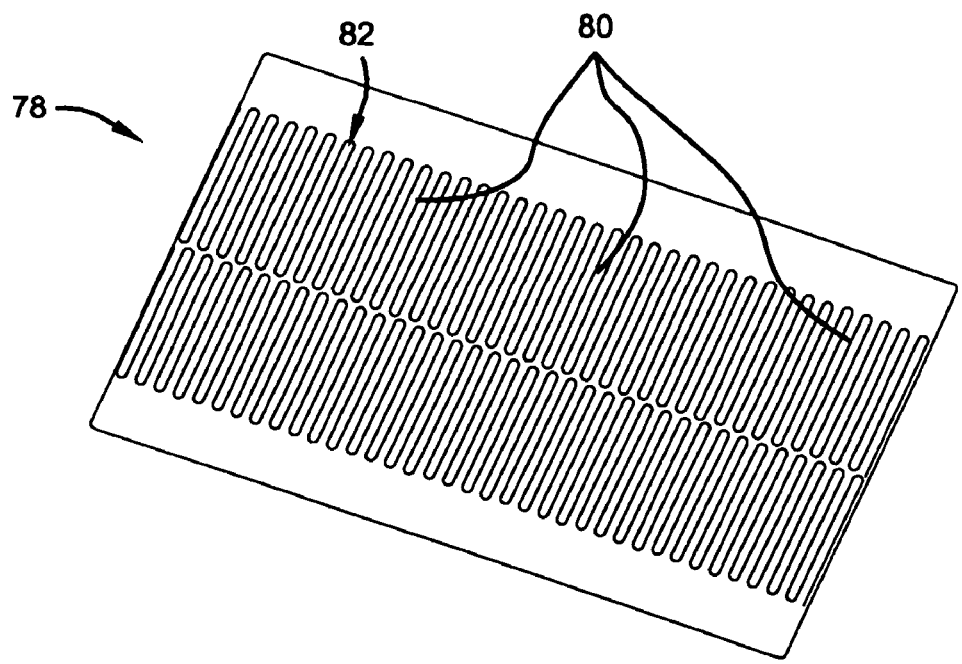
FIG. 3 is a perspective view of a sheet of conductive material having an anti-bonding material disposed thereon.

Turning now to FIG. 2, the bipolar plate 12 is shown in greater detail. The bipolar plate 12 generally includes a first and second plate 60, 62 joined together at a predetermined bonding area 68 as will be described in greater detail. The first and second plate 60, 62 are preferably comprised of a conductive material such as aluminum alloy or stainless steel for example. The flow channels 18 of the bipolar plate 12 are further defined by an anode flow field 70 disposed on an outer surface of the first plate 60, a cathode flow field 72 disposed on an outer surface of the second plate 62 and a coolant flow field 76 disposed between the first and second plates 60, 62. In operation, the anode flow field 70 of the first plate 60 distributes the fuel to the anode face 8a of the MEA 8. Similarly, the cathode flow field 72 of the second plate 62 distributes the oxidant gas to the cathode face 10c of the MEA 10. Coolant is communicated through the coolant flow field 76 through the coolant plumbing 50 and 52.

With reference now to FIGS. 3-6, a method of making the bipolar plate 12 according to the present invention will be described in greater detail. In a preferred method, the first and second plate 60, 62 are joined prior to forming the channels 18 of the flow fields 70, 72 and 76. First, a strip of conductive material 78 is rolled from stock or otherwise acquired. The strip should be in the annealed or softened condition. Next, an anti-bonding material 80 (FIG. 3) is placed onto a bonding face 82 of the strip of material 78. The anti-bonding bonding material 80 may comprise colloidal-graphite for example. It is appreciated however that other anti-bonding materials may be employed.

The anti-bonding material 80 is placed in a pattern representing a desired flow field (FIG. 3) hereinafter referred to as the expansion area 84. Next, the strip of material 78 having the anti-bonding material 80 along with a complementary strip of conductive material 88 is passed through a rolling mill that bonds the two strips together in the areas that did not contain the anti-bonding pattern hereinafter referred to as the bonding area 94. The rolling mill imposes a compression force onto the two sheets 78, 88 causing a thickness reduction and a metallurgical bond at the bonding area 94. The two bonded sheets 78, 88 comprise a two-piece bonded plate and further represent the first and second plate 60, 62 of the bipolar plate 12.

Figure 4:
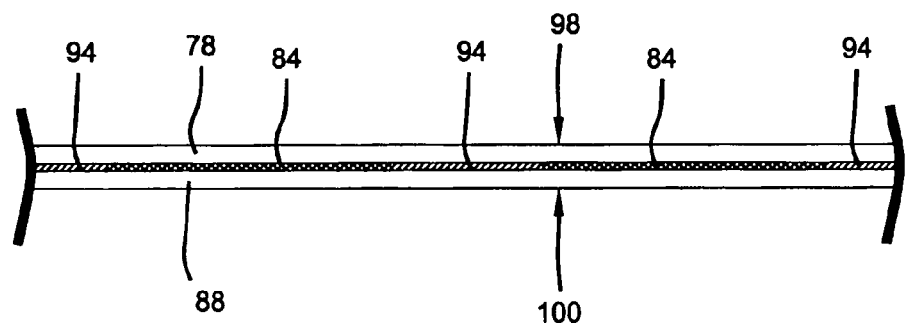
FIG. 4 is a cutaway view of a first and second sheet of conductive material bonded together after a roll bonding operation.
Figure 5:
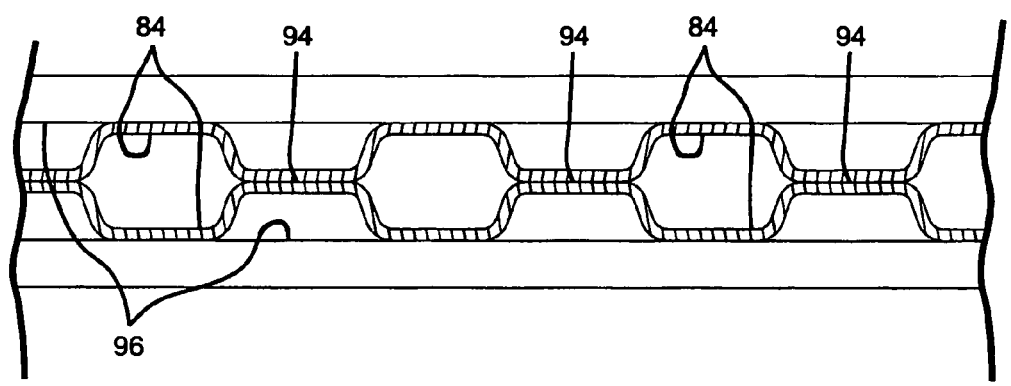
FIG. 5 is the cutaway view of FIG. 4 shown after a pressure forming operation.

With specific reference to FIGS. 4 and 5, pressurized fluid is introduced between the two bonded sheets 78, 88 to form the respective flow channels 18 (FIG. 2). As shown, the bonding area 94 of the two sheets 78, 88 remains bonded and the expansion area 84 is expanded outwardly. Preferably, an outer boundary 96 is placed a predetermined lateral distance from respective outer surfaces 98, 100 of the first and second plate 60, 62. The outer boundary 96 is configured to define the flow channel depth and additionally, encourages the formation of a flat surface top on the flow channels desirable for electrical contact in the fuel cell stack, improving dimensional tolerance and decreasing contact stresses between plates.

Figure 6:
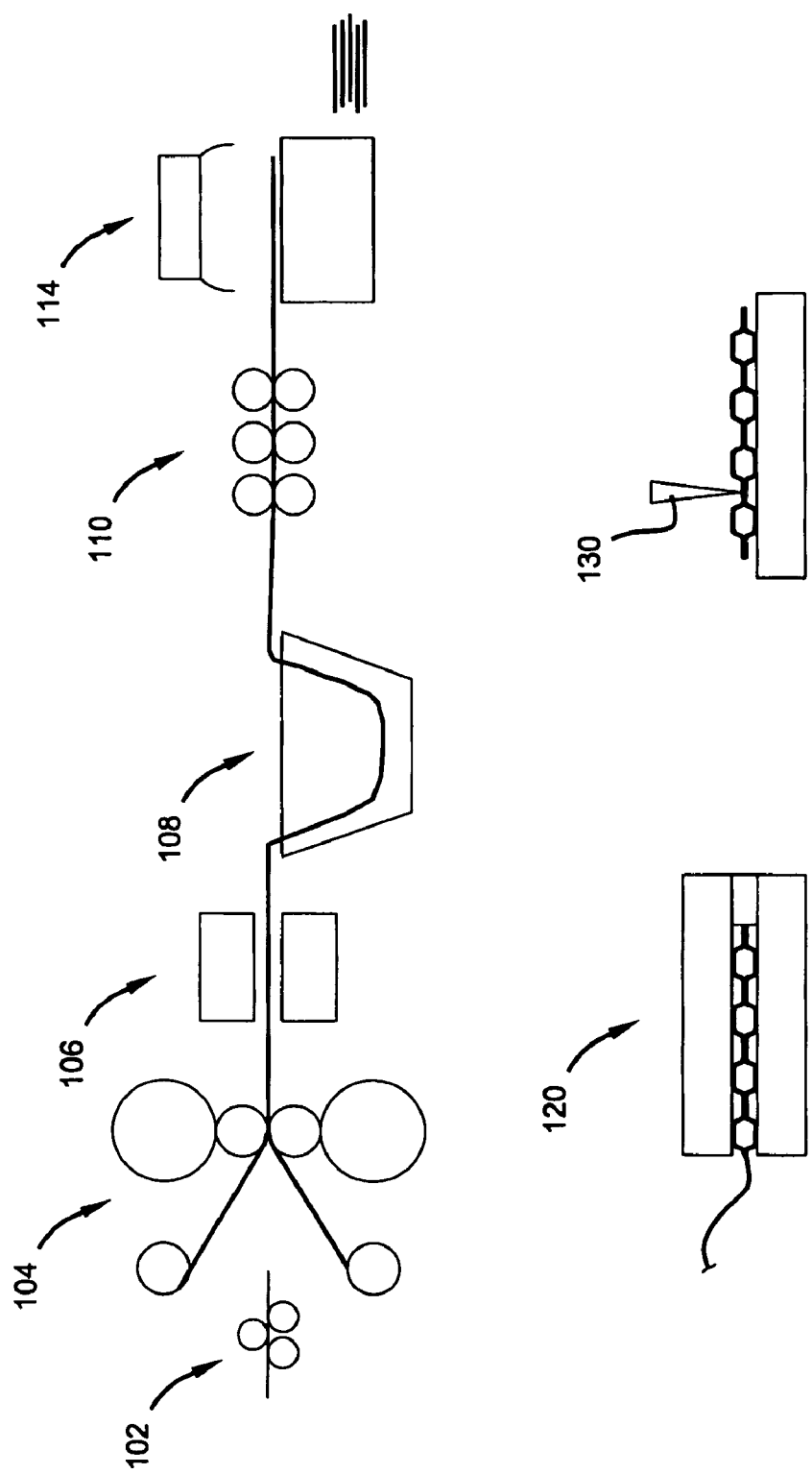
FIG. 6 is a depiction of an exemplary assembly process according to the present invention.
Figure 7:
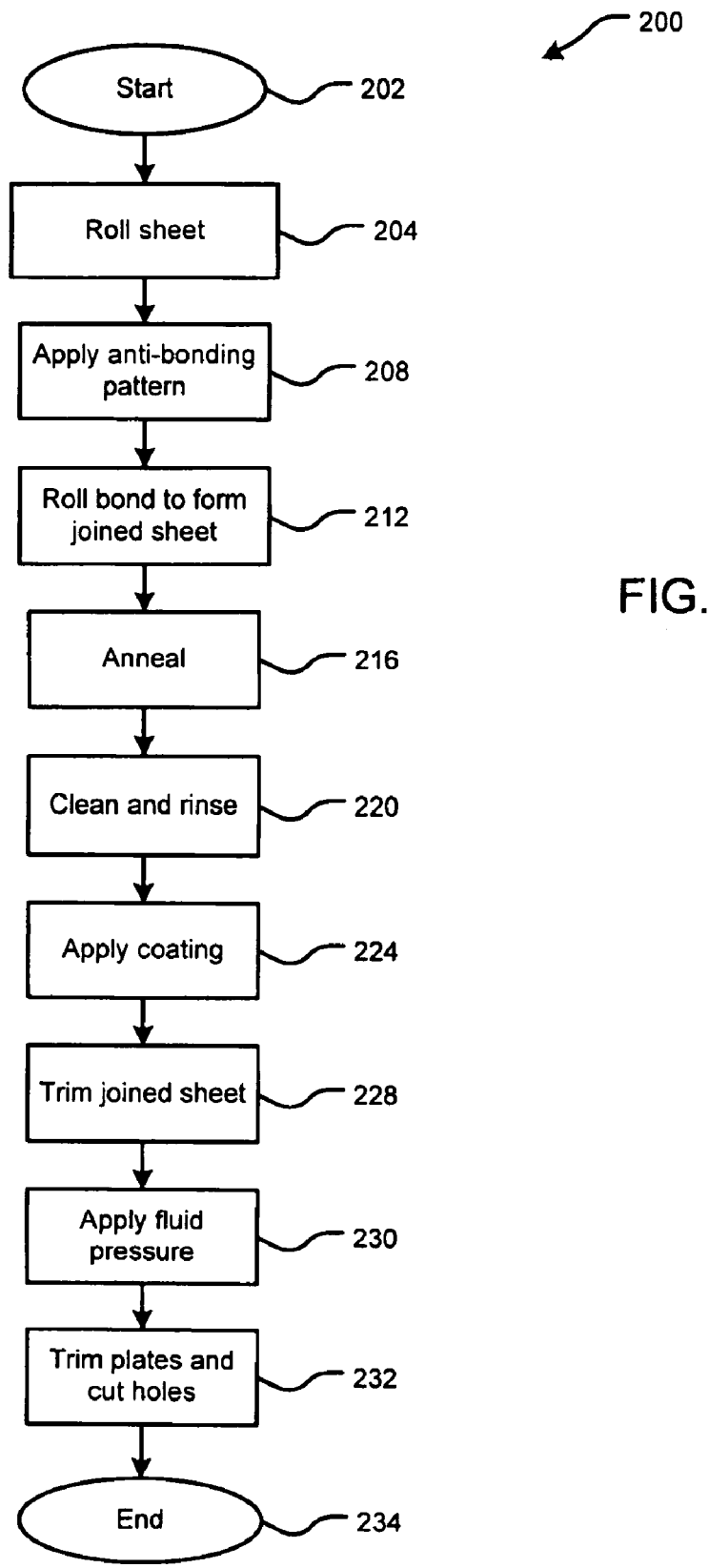
FIG. 7 is a flow diagram illustrating steps for roll bonding and pressure forming a bipolar plate according to the present invention.

Turning now to FIGS. 6 and 7 steps for fabricating a bipolar plate according to the present invention are shown generally at 200. Fabrication begins with step 202. In step 204 the sheet of material 78 is rolled from stock. In step 208, the anti-bonding material 80 is placed in a desired pattern onto the sheet of material 78 through a rolling applicator 102. In step 212 the sheet of material 78 along with the complementary sheet of material 88 is introduced into a rolling mill 104. The rolling mill 104 provides a bond at the bonding area 94 thereby joining the two sheets 78 and 88 together. In step 216, the joined sheets 78, 88 are annealed with an annealing device 106. In step 220 the sheets 78, 88 are cleaned through a continuous clean and rinse bath 108.

In step 224, a coating to encourage conductivity is applied through a roll coating apparatus 110 on the outer surfaces 98, 100 of the sheets 78, 88. In step 228 the sheets 78, 88 are cut from the roll by a blanking press 114 defining the first and second plates 60, 62. The plates 60, 62 are then placed into a fixture 120 such as a die having the outer boundaries 96 and fluid is introduced between the plates 60, 62 in step 230. In step 232 the newly formed bipolar plates 12 are trimmed and holes including header apertures are placed in desired locations by a trimming tool 130. Fabrication ends in step 234.

It is appreciated that some of the steps 200 outlined in the preceding discussion may be modified or placed in an alternative sequence. For example the application of the conductive coating in step 224 may alternatively be applied before the roll bonding step 212. In addition, header apertures may alternatively be formed during the fluid expansion step 230. Accordingly, die extensions may be incorporated into the fixture 120 that encourage headers to form in the header portion of the bipolar plate 12 upon fluid expansion.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for making a current collector plate comprising:
   providing a first sheet of material having a first bonding face and a first outer face;
   providing a second sheet of material having a second bonding face and a second outer face;
   creating a plurality of patterned areas on at least one of said first bonding face and said second bonding face;
   bonding said first and second sheets together; and
   injecting fluid between said first and second sheets thereby causing said first sheet to project outward at said plurality of patterned areas wherein a first anode fluid flow channel having a defined inlet and outlet is defined on said first outer face and wherein a second self-contained coolant fluid flow channel is defined between said first and second sheets at said plurality of patterned areas, wherein said first and second anode and self-contained coolant flow channels do not connect.

2. The method of claim 1 wherein forming a plurality of patterned areas includes placing an anti-bonding material compatible for fuel cell use on at least one of said first bonding face and said second bonding face, and defining bonding areas at the remaining areas of said first bonding face and said second bonding face.

3. The method of claim 2 wherein bonding further includes:
   contacting said first bonding face with said second bonding face; and
   imposing a force onto at least one of said first and second outer face thereby joining said first and second sheets at said bonding area.

4. The method of claim 3 wherein contacting said first bonding face with said second bonding face defines a first thickness; and
   joining said first and second sheets at said bonding area defines a second thickness, said second thickness less than said first thickness.

5. The method of claim 4 wherein imposing a force includes roll bonding said first and second sheets together.

6. The method of claim 1 wherein injecting fluid further comprises:
   placing said first and second bonded sheets into a die having spaced apart first and second boundaries; and
   injecting fluid between said first and second bonded sheets whereby extension portions contact one of said first and second boundaries so as to form a flat surface thereat.

7. The method of claim 1, further comprising applying a conductive coating onto said first and second outer face.

8. A method for making a current collector plate comprising:
   placing an anti-bonding material onto a first surface of a first sheet of material in a predetermined pattern thereby forming patterned areas defined by said anti-bonding material and adjacent non-patterned areas;
   contacting a second sheet of material with said anti-bonding material;
   forming a metallurgical bond between said first and second sheets at said non-patterned areas thereby creating a two-piece bonded plate; and
   introducing fluid between said two-piece bonded plate to cause said first sheet to project outward defining projected portions at said patterned area wherein a first anode fluid flow channel having a defined inlet and outlet is defined on a first outer face of said first sheet of material and wherein a second self-contained coolant fluid flow channel is defined between said first and second sheets of material at said patterned area, wherein said first and second anode and self-contained flow channels do not connect.

9. The method of claim 8 wherein introducing fluid further comprises:
   placing said two-piece bonded plate into a die having a first boundary and a second boundary; and
   injecting fluid between said two-piece bonded plate whereby said projected portions contact one of said first boundary and said second boundary so as to form a flat surface thereat.

10. The method of claim 8 wherein forming a metallurgical bond includes roll bonding said first and second sheet together.

11. The method of claim 8, further comprising rolling said first and second sheet from a rolled stock of material.

12. The method of claim 8, further comprising applying a conductive coating onto an outer face of said respective first and second sheet.

13. A method for making a current collector plate comprising:
   providing a first sheet of conductive material;
   providing a second sheet of conductive material;
   placing an anti-bonding material in a desired pattern over a bonding surface of said first sheet of conductive material, said pattern of anti-bonding material defining an anti-bonding area along said first sheet, wherein the remaining surface of said bonding surface absent said anti-bonding material defines a bonding area;
   contacting said second sheet of conductive material with said anti-bonding material of said first sheet of conductive material;
   roll bonding said first and second sheets together whereby said first and second sheets form a metallurgical bond therebetween at said bonding area and defining a two-piece bonded plate; and
   injecting fluid between said first and second bonded sheets whereby said anti-bonding area is expanded outwardly defining expanded portions along said desired pattern wherein a first anode fluid flow channel is defined on a first outer face of said two-piece bonded place, a second self-contained coolant fluid flow channel is defined through said expanded portions, and a third cathode fluid flow channel is defined on a second outer face of said two-piece bonded plate, wherein said first anode flow channel, said second self-contained coolant flow channel and third cathode flow channels do not connect, and wherein said first anode flow channel, said second self-contained coolant flow channel and third cathode flow channels each provide a defined inlet and outlet, respectively.

14. The method of claim 13 wherein injecting fluid further comprises:
   placing said first and second bonded sheets into a die having a first and second boundary; and
   injecting fluid between said first and second bonded sheets whereby said expanded portions contact one of said first and second boundary so as to form a flat surface thereat.

15. The method of claim 1 wherein injecting fluid further causes said second sheet of material to project outward wherein a third cathode flow channel is defined on said second outer face.

16. The method of claim 8 wherein introducing fluid further causes said second sheet of material to project outward wherein a third cathode flow channel is defined on a second outer face of said second sheet of material.

17. The method of claim 2, wherein the anti-bonding material comprises colloidal graphite.

* * * * *